US011562364B2

(12) United States Patent
Sekine et al.

(10) Patent No.: US 11,562,364 B2
(45) Date of Patent: Jan. 24, 2023

(54) INFORMATION PROCESSING SYSTEM, CUSTOMER IDENTIFICATION APPARATUS, AND INFORMATION PROCESSING METHOD

(71) Applicant: NEC Corporation, Tokyo (JP)

(72) Inventors: Mizuto Sekine, Tokyo (JP); Masato Kitada, Tokyo (JP); Yoshinori Ehara, Tokyo (JP); Saika Goto, Tokyo (JP)

(73) Assignee: NEC CORPORATION, Tokyo (JP)

( * ) Notice: Subject to any disclaimer, the term of this patent is extended or adjusted under 35 U.S.C. 154(b) by 64 days.

(21) Appl. No.: 17/233,920

(22) Filed: Apr. 19, 2021

(65) Prior Publication Data

US 2021/0241285 A1    Aug. 5, 2021

Related U.S. Application Data

(63) Continuation of application No. 16/466,809, filed as application No. PCT/JP2017/032080 on Sep. 6, 2017, now Pat. No. 11,017,400.

(30) Foreign Application Priority Data

Dec. 22, 2016   (JP) ................ 2016-248811

(51) Int. Cl.
*G06T 7/50*    (2017.01)
*G06Q 20/40*    (2012.01)
(Continued)

(52) U.S. Cl.
CPC ... *G06Q 20/40145* (2013.01); *G06F 16/5854* (2019.01); *G06K 9/6215* (2013.01);
(Continued)

(58) Field of Classification Search
CPC ............. G06K 9/6215; G06K 9/00771; G06K 9/00335; G06K 9/00362; G06K 9/00288; G06T 7/50; G06T 2207/30196
See application file for complete search history.

(56) References Cited

U.S. PATENT DOCUMENTS 8,010,402 B1    8/2011  Sharma et al.
2011/0176005 A1   7/2011  Kaneko et al.
(Continued)

FOREIGN PATENT DOCUMENTS

CN    102187355 A    9/2011
CN    102631730 A    12/2012
(Continued)

OTHER PUBLICATIONS

International Search Report for PCT/JP2017/032080 dated Dec. 5, 2017 [PCT/ISA/210].
(Continued)

*Primary Examiner* — Sam Bhattacharya
(74) *Attorney, Agent, or Firm* — Sughrue Mion, PLLC

(57) ABSTRACT

According to the present invention, there is provided an information processing system (100) including an acquisition unit (11) that acquires an image, which is generated by a camera, of a face, a selection unit (14) that extracts a person in the acquired image, and selects a person who performs a settlement process based on at least one of a distance from a checkout apparatus, an appearance frequency, and an appearance period of time in a case where a plurality of persons are extracted, an identification unit (12) that identifies the selected person based on the image in which the person is included, and database information in which a feature value of a face is registered, a settlement unit (checkout unit (21)) that performs the settlement process with respect to the identified person.

12 Claims, 14 Drawing Sheets

(51) Int. Cl.
    *G06F 16/583* (2019.01)
    *G06K 9/62* (2022.01)
    *G07G 1/12* (2006.01)
    *G07G 1/00* (2006.01)
    *G06V 40/10* (2022.01)
    *G06V 40/20* (2022.01)
    *G06V 40/16* (2022.01)

(52) U.S. Cl.
    CPC ............ *G06T 7/50* (2017.01); *G06V 40/10* (2022.01); *G06V 40/172* (2022.01); *G06V 40/20* (2022.01); *G07G 1/00* (2013.01); *G07G 1/12* (2013.01); *G06T 2207/30196* (2013.01); *G06V 40/178* (2022.01); *G07G 1/0036* (2013.01)

(56) References Cited

U.S. PATENT DOCUMENTS

2012/0321147 A1  12/2012  Kamiya
2016/0189162 A1  6/2016  Taira et al.

FOREIGN PATENT DOCUMENTS

| | | | |
|---|---|---|---|
| CN | 105741451 A | 7/2016 | |
| JP | 2000-322660 A | 11/2000 | |
| JP | 2006-244279 A | 9/2006 | |
| JP | 4230049 B2 | 2/2009 | |
| JP | 2010-055248 A | 3/2010 | |
| JP | 2010-097256 A | 4/2010 | |
| JP | 2016-126749 * | 7/2016 | ............ G06K 7/14 |
| JP | 2016-126749 A | 7/2016 | |

OTHER PUBLICATIONS

International Search Report for PCT/JP2017/032080 dated Dec. 5, 2017.
Chinese Office Action for CN Application No. 201780079814.0 dated Dec. 3, 2020 with English Translation.
Japanese Office Communicattan for JP Application No. 2018-557532 dated Oct. 14, 2022.

* cited by examiner

INFORMATION PROCESSING SYSTEM, CUSTOMER IDENTIFICATION APPARATUS, AND INFORMATION PROCESSING METHOD

CROSS-REFERENCE TO RELATED APPLICATIONS

The present application is a continuation application of U.S. patent application Ser. No. 16/466,809 filed on Jun. 5, 2019, which is a National Stage Entry of international application PCT/JP2017/032080, filed Sep. 6, 2017, which claims the benefit of priority from Japanese Patent Application 2016-248811 filed on Dec. 22, 2016, the disclosures of all of which are incorporated in their entirety by reference herein.

TECHNICAL FIELD

The present invention relates to an information processing system, a customer identification apparatus, an information processing method, and a program.

BACKGROUND ART

Patent Document 1 discloses an information processing system using a face authentication process for a settlement operation. Patent Document 1 discloses that the information processing system acquires information which includes face information of a visitor, and performs face authentication using the face information, which is included in the acquired information, of the visitor and registered face information, which has been registered in a member database, of each member.

RELATED DOCUMENT

Patent Document

[Patent Document 1] Japanese Unexamined Patent Publication No. 2016-126749

SUMMARY OF THE INVENTION

Technical Problem

In a technology for identifying a person to make settlement using a face authentication process, there is a problem in that accuracy of identification of the person to make settlement is lowered in a case where a plurality of persons are extracted from an image. An object of the present invention is to improve the accuracy of identification of the person to make settlement using the face authentication process.

According to the present invention, there is provided an information processing system including:
  an acquisition unit that acquires an image, which is generated by a camera, of a face;
  a selection unit that extracts a person in the acquired image, and selects a person who performs a settlement process based on at least one of a distance from a checkout apparatus, an appearance frequency, and an appearance period of time in a case where a plurality of persons are extracted;
  an identification unit that identifies the selected person based on the image in which the person is included, and database information in which a feature value of a face is registered; and
  a settlement unit that performs the settlement process with respect to the identified person.

In addition, according to the present invention, there is provided a customer identification apparatus including:
  an acquisition unit that acquires an image, which is generated by a camera, of a face;
  a selection unit that extracts a person in the acquired image, and selects a person who performs a settlement process based on at least one of a distance from a checkout apparatus, an appearance frequency, and an appearance period of time in a case where a plurality of persons are extracted;
  an identification unit that identifies the selected person based on the image in which the person is included, and database information in which a feature value of a face is registered; and
  a notification unit that notifies information for identifying the person who performs the settlement process and who is identified by the identification unit to the checkout apparatus.

In addition, according to the present invention, there is provided an information processing method, which is performed by a computer, the method including:
  an acquisition step of acquiring an image, which is generated by a camera, of a face;
  a selection step of extracting a person in the acquired image, and selecting a person who performs a settlement process based on at least one of a distance from a checkout apparatus, an appearance frequency, and an appearance period of time in a case where a plurality of persons are extracted;
  an identification step of identifying the selected person based on the image in which the person is included, and database information in which a feature value of a face is registered; and
  a settlement step of performing the settlement process with respect to the identified person.

In addition, according to the present invention, there is provided a program causing a computer to function as:
  an acquisition unit that acquires an image, which is generated by a camera, of a face;
  a selection unit that extracts a person in the acquired image, and selects a person who performs a settlement process based on at least one of a distance from a checkout apparatus, an appearance frequency, and an appearance period of time in a case where a plurality of persons are extracted;
  an identification unit that identifies the selected person based on the image in which the person is included, and database information in which a feature value of a face is registered; and
  a settlement unit that performs the settlement process with respect to the identified person.

Advantageous Effects of Invention

According to the present invention, it is possible to improve accuracy of identification of a person to make settlement using a face authentication process.

BRIEF DESCRIPTION OF THE DRAWINGS

The above-described object, other objects, features, and advantages will be further apparent with preferable example embodiments, which will be described below, and the accompanying drawings below.

DESCRIPTION OF EMBODIMENTS

First Example Embodiment

Figure 1:
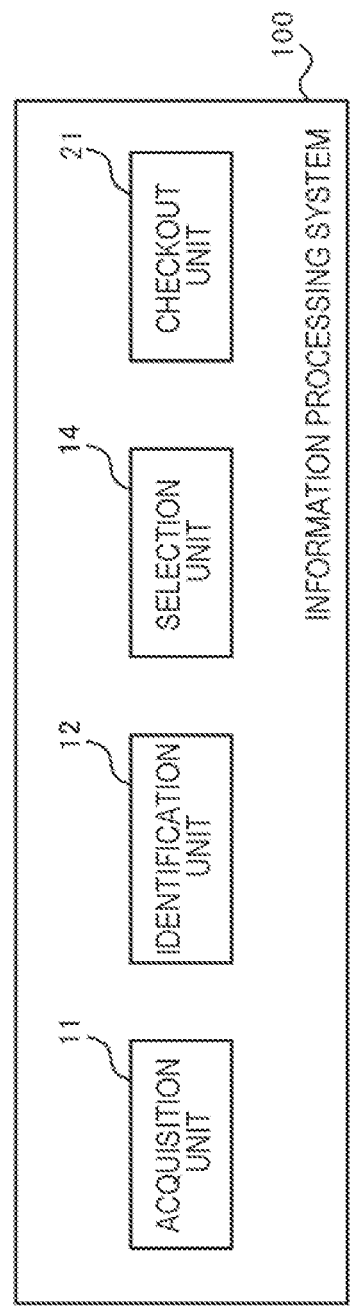
FIG. 1 is an example of a functional block diagram illustrating an information processing system of the present example embodiment.

FIG. 1 illustrates an example of a functional block diagram of an information processing system 100 of the present example embodiment. As illustrated in the drawing, the information processing system 100 includes an acquisition unit 11, an identification unit 12, a selection unit 14, and a checkout unit 21. The information processing system 100 of the present example embodiment is, for example, a point of sales (POS) register. It may be assumed that the POS register is operated by a sales clerk or is operated by a customer.

Here, an example of a hardware configuration of the information processing system 100 will be described. The respective functional units included in the information processing system 100 of the present example embodiment are realized by any combination of hardware and software of any computer based on a Central Processing Unit (CPU), a memory, a program which is loaded on the memory, a storage unit (which is capable of storing a program which is downloaded from a storage medium, such as a Compact Disc (CD), a server on the Internet, or the like, in addition to a program that is previously stored from a stage in which an apparatus is delivered), such as a hard disk, which stores the program, and an interface for network connection. Furthermore, those skilled in the art understand that various modification examples exist for a method and an apparatus, which realize the store system.

Figure 2:
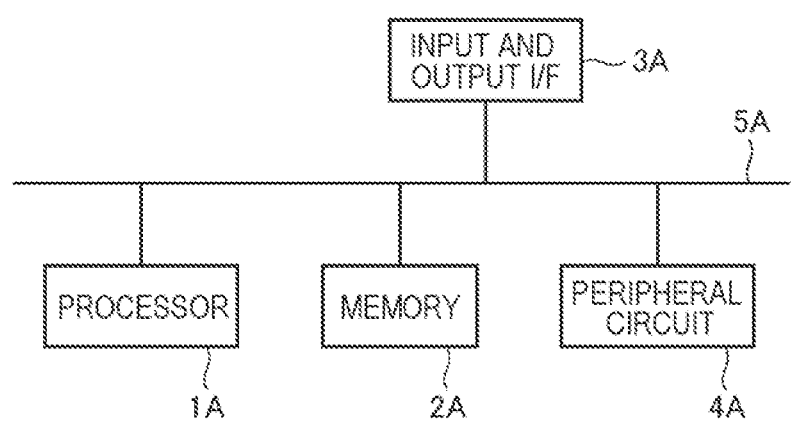
FIG. 2 is a diagram conceptually illustrating an example of a hardware configuration of a system and an apparatus of the present example embodiment.

FIG. 2 is a block diagram illustrating the hardware configuration of the information processing system 100 of the present example embodiment. As illustrated in FIG. 2, the information processing system 100 includes a processor 1A, a memory 2A, an input and output interface 3A, a peripheral circuit 4A, and a bus 5A. The peripheral circuit 4A includes various modules.

The bus 5A is a data transmission path which is used for the processor 1A, the memory 2A, the peripheral circuit 4A, and the input and output interface 3A to transmit and receive data to and from each other. The processor 1A is, for example, an arithmetic processing apparatus such as the Central Processing Unit (CPU) or a Graphics Processing Unit (GPU). The memory 2A is, for example, a memory such as a Random Access Memory (RAM) or a Read Only Memory (ROM). The input and output interface 3A includes an interface which is used to acquire information from an input apparatus (for example: a keyboard, a mouse, a microphone, a physical key, a touch panel display, a code reader, or the like), an external apparatus, an external server, an external sensor, and the like, and an interface which is used to output information to an output apparatus (for example: a display, a speaker, a printer, an emailer, or the like), the external apparatus, the external server, and the like. It is possible for the processor 1A to output an instruction to each of the modules and to perform an arithmetic operation based on an arithmetic result of each of the modules.

Subsequently, each functional unit illustrated in FIG. 1 will be described in detail.

The checkout unit 21 includes a unit (registration unit) that performs a process (registration process) of registering a product to be checked out, and a unit (a settlement unit) that performs a settlement process.

First, the registration process, which is performed by the checkout unit 21, will be described. The checkout unit 21 includes a unit that is used to input information for identifying the product to be checked out. The input is realized by various apparatuses such as the code reader, the physical key, the touch panel display, the microphone, and the camera.

For example, the information for identifying the product may be input in such a way that the code reader reads a code which is attached to the product and which indicates information for identifying the product. In addition, the information for identifying the product may be input through operation of the physical key or the touch panel display. In addition, the information for identifying the product may be input by voice through the microphone. In addition, the information for identifying the product may be input using the camera that captures the product to be checked out and a unit that identifies a product included in an image which is generated by the camera based on the feature value of appearance of the product or a code (the information for identifying the product which is attached to the product) included in the mage.

It is possible for the checkout unit 21 to acquire product information (for example, price or the like) corresponding to the information for identifying the product to be checked out from a previously prepared product master. Furthermore, it is possible for the checkout unit 21 to compute the sum of prices of one or more products to be checked out. Furthermore, it is possible for the checkout unit 21 to display the information for identifying the product to be checked out, the computed sum, and the like on the display or the like.

Subsequently, a settlement process performed by the checkout unit 21 will be described. The settlement process refers to completing a sales transaction in which the amount of money to be paid is decided, by a selected payment method (cash, a credit card, points, or the like). It is possible for the checkout unit 21 to perform the settlement process using electronic money information or point information, which corresponds to the customer identified through a face authentication process. That is, in a case where the information for identifying the customer (a person who makes payment for the product) identified by the identification unit 12, which will be described below, is acquired, it is possible for the checkout unit 21 to acquire the electronic money information or the point information, which corresponds to the customer, from the server. Furthermore, it is possible for the checkout unit 21 to perform the settlement process using the electronic money information or the point information. That is, the settlement process of paying the sum of the prices of the products to be checked out using the electronic money or the points or a settlement process of adding points, which are given in present shopping, to remaining points indicated by the point information may be performed. In addition, in a case of the information processing system 100 in a store installed in an inside of an organization such as a company, a settlement process may be performed by accumulating the amount of money to be paid in association with information (for example: employee number) for identifying the customer within the organization, and deducting the amount of money to be paid from salaries.

It should be noted that, it may be possible for the checkout unit 21 to perform the settlement process using the cash, the credit card, another type of electronic money, another type of point, and the like. For example, in a case where the customer is not identified by the identification unit 12, the settlement process may be performed using another method which is illustrated.

The checkout unit 21 performs the registration process and the settlement process in this order. When an operation is performed to start the settlement process after the registration process of registering at least one product, the checkout unit 21 starts the settlement process according to the operation.

The operation performed to start the settlement process may be, for example, pressing of the physical key corresponding to "start of the settlement process". In addition, the operation may be, for example, an operation (for example: touch) to be performed on an area corresponding to the "start of the settlement process" over a touch panel area. In addition, the operation may be, for example, an input of a prescribed word corresponding to the "start of the settlement process" through the microphone. Note that, the examples here are only examples, and the present invention is not limited thereto.

The acquisition unit 11 acquires the image (an image of a face of the customer) generated by the camera which captures the customer. For example, the camera is installed in a vicinity of the information processing system 100, for example, installed to be integrated with the information processing system 100. Furthermore, the camera is installed to capture a customer who is located in the vicinity of the information processing system 100, more specifically, a customer who is under checkout. The camera may capture a moving image in succession or may capture a still image at a prescribed timing. That is, the acquisition unit 11 may acquire images corresponding to a plurality of frames which are generated in succession at prescribed time intervals, or may acquire one image, which is generated at certain timing, from the camera.

It is possible for the selection unit 14 to extract a person in the image acquired by the acquisition unit 11, and to select a person who performs the settlement process among a plurality of persons based on a at least one of a distance from the checkout apparatus (in a case of the present example embodiment, the information processing system 100), an appearance frequency (that is, a frequency acquired by capturing with the camera during a prescribed time frame), and an appearance period of time (that is, a period of time acquired by capturing with the camera during the prescribed time frame) in a case where the plurality of persons are extracted.

It is possible for the selection unit 14 of the present example embodiment to select the person who performs the settlement process from among the plurality of persons based on mainly the distance from the checkout apparatus. In a case where the camera is installed in a vicinity of the checkout apparatus, for example, installed to be integrated with the checkout apparatus, a "distance between the camera and the person" indicates a "distance between the checkout apparatus and the person".

For example, the selection unit 14 may select a person of which a distance from the camera is the shortest as the person who performs the settlement process. In addition, the selection unit 14 may select persons of which the distance from the camera is equal to or less than a reference value as candidates of the person who performs the settlement process. Furthermore, in a case where there exist a plurality of candidates who are selected based on the distance from the camera, the selection unit 14 may select the person who performs the settlement process from among the plurality of candidates based on another condition.

The distance from the camera may be estimated through image analysis. For example, a person who is photographed such that a length of a prescribed part (for example: an interval between eyes) of a body is the longest may be determined as the person of which the distance from the camera is the shortest. In addition, a person who is photographed such that the length of the prescribed part (for example: the interval between eyes) of the body is equal to or larger than the reference value may be determined as the person of which the distance from the camera is equal to or less than the reference value. Note that, the distance from the camera may be estimated using another method.

Here, another condition, which is applied in a case where there exist the plurality of candidates who are selected based on the distance from the checkout apparatus, will be described. For example, the selection unit 14 may select a person of which a period of time (a period of time included in the image) acquired by capturing with the camera during the prescribed time frame is the longest as the person who performs the settlement process from among the plurality of candidates. In addition, the selection unit 14 may select a person of which a frequency (frequency included in the image) acquired by capturing with the camera during the prescribed time frame is the highest as the person who performs the settlement process from among the plurality of candidates. The frequency acquired by capturing with the camera may be the number of times that is counted in such a way that, for example, extraction from an image corresponding to one frame is once. The period of time acquired by capturing with the camera has the same meaning as a period of time included in the moving image. In order to compute the period of time and frequency acquired by capturing with the camera, it is necessary to group the same person who is included over the images corresponding to the plurality of frames. For example, the persons who are extracted from the image and of which feature values are similar may be collectively grouped.

A timing, in which the prescribed time frame starts, may be, for example, a prescribed operation which is performed before an operation of starting the settlement process. Although a timing, in which an initial product registration is performed, or the like is illustrated as an example, the present invention is not limited thereto. For example, although a timing, in which the operation of starting the settlement process is performed, or the like is illustrated as an example of a timing, in which the prescribed time frame ends, the present invention is not limited thereto.

Another example of another condition will be described. For example, the selection unit 14 may select a person who performs a prescribed behavior, which is previously decided, as the person who performs the settlement process from among the plurality of candidates. The prescribed behavior is a prescribed behavior which is considered to be performed by the person who performs the settlement process. For example, although "raising hand", "pointing themself using a finger or the like", and the like are exemplified, the present invention is not limited thereto. These are behaviors which are considered to be performed by the person who performs the settlement process in response to an inquiry "who will pay for?" from the sales clerk.

Another example of another condition will be described. For example, the selection unit 14 may select a person who makes a remark, which is previously decided, as the person who performs the settlement process from among the plurality of candidates. Content of the remark is considered to be given by the person who performs the settlement process. For example, information for specifying a settlement method, and the like may be considered to be the content of the remark. That is, "cash", a "card", a name or a popular name of a prescribed payment service, and the like may be considered. For example, in a case where a name of the payment service using the face authentication is "face pass", the selection unit 14 may identify a person who makes a remark of "face pass".

In a case of the example, the information processing system 100 may include a microphone (voice acquisition unit). Furthermore, the selection unit 14 may detect that a prescribed remark as described above is made by performing voice analysis on sounds which are collected by the microphone. Furthermore, the selection unit 14 may analyze the moving image captured by the camera, and may identify a person whose mouth is moving (or a person who performs prescribed movement corresponding to the content of the remark) at a timing in which the prescribed remark is detected.

It should be noted that, the selection unit 14 may select the person who performs the settlement process (a person who satisfies a condition of the distance from the camera or another condition) from among the persons of which estimated ages estimated based on the image are equal to or larger than the reference value. In other words, the selection unit 14 may exclude persons of which the estimated ages estimated based on the image are less than the reference value from the person who performs the settlement process.

It should be noted that, in a case where persons of which the estimated ages are equal to or larger than the reference value and persons of which the estimated ages are less than the reference value are extracted from the image, the selection unit 14 may select the person who performs the settlement process from among the persons of which the estimated ages are equal to or larger than the reference value. That is, in a case where only the persons of which the estimated ages are less than the reference value are extracted, the selection unit 14 may select the person who performs the settlement process from among the persons of which the estimated ages are less than the reference value.

In addition, the selection unit 14 may select the person who performs the settlement process (the person who satisfies the condition of the distance from the camera and another condition) from among persons who make movement. In other words, the selection unit 14 may exclude persons who do not make the movement from the person who performs the settlement process.

It should be noted that, in a case where one person is extracted from the image, it is possible for the selection unit 14 to select the person as the person who performs the settlement process.

The identification unit 12 identifies the person extracted in the image based on database information in which the feature value of an appearance of each of the plurality of persons is registered. The identification unit 12 extracts the feature value of the appearance of the person extracted from the image. Furthermore, the identification unit 12 collates the feature value of the person extracted from the image with the feature value, which is included in the database information, of the appearance of each of the plurality of persons, and determines a person of which a degree of similarity is equal to or larger than the reference value.

In a case where it is possible to determine the person of which the degree of similarity is equal to or larger than the reference value in the database information, the identification unit 12 outputs information for identifying the person as an identification result. On the other hand, in a case where it is not possible to determine the person of which the degree of similarity is equal to or larger than the reference value in the database information, the identification unit 12 outputs "no person concerned" as the identification result.

Here, an example of a flow of a process of the information processing system 100 will be described with reference to a sequence diagram of FIG. 3. Here, it is assumed that the selection unit 14 selects a person of which a distance from the camera is the shortest as the person who performs the settlement process.

The information processing system 100 performs a registration and settlement process and an authentication process (a process of identifying the person who performs the settlement process) in parallel. First, in a case where the product registration process starts in the registration and settlement process (S10), a notification thereof is provided to the authentication process (S11). According thereto, a process of identifying the customer starts in the authentication process. Specifically, the image is acquired (S14), the person who performs the settlement process is selected from among the persons included in the image (S15). In S15, first, the persons included in the image are extracted. Furthermore, in a case where the number of persons included in the image is plural, the person of which the distance from the camera is the shortest is selected as the person who performs the settlement process. On the other hand, in a case where the number of persons included in the image is one, the one person is selected as the person who performs the settlement process.

Thereafter, the information processing system 100 performs the process of identifying the person who performs the settlement process (S16). That is, the feature value of the appearance of the person who is selected to perform the settlement process in S15 is extracted, and a collation process is performed using the database information. Furthermore, the information processing system 100 accumulates the identification results (information for identifying the person or no person concerned) which are acquired through the collation process (S17). In the authentication process, S14 to S17 are repeated until a notification in S18 is received.

On the other hand, in the registration and settlement process, the product registration is received (S12) even after the product registration process in S10 starts. While the operation of starting the settlement process is not performed (No in S13), the product registration is received (S12). In a case where the operation of starting the settlement process is performed (Yes in S13), a notification thereof is provided to the authentication process (S18).

In the authentication process, for example, the process of identifying the customer (S14 to S17) ends according to the notification of S18. Furthermore, from among the identification results (in which the information for identifying the person or no person concerned is associated with each of the frames on which the image analysis is performed) which are accumulated by that time, a prescribed identification result (the information for identifying the person or no person concerned, which is associated with a prescribed frame) is extracted (S19), and the prescribed identification result is notified to the registration and settlement process (S20).

For example, the newest identification result at a point of time in which the notification in S18 is provided may be extracted. Furthermore, in a case where the newest identification result is the information for identifying the person, the identification result may be notified to the registration and settlement process. On the other hand, in a case where the newest identification result is no person concerned, another identification result may be extracted under a prescribed search condition. Furthermore, in a case where another identification result is the information for identifying the person, the identification result may be notified to the registration and settlement process. On the other hand, in a case where another identification result is no person concerned, another identification result may be further extracted under a prescribed search condition. Furthermore, in a case where the identification result is no person concerned in succession as many as a prescribed number, no person concerned may be notified to the registration and settlement process.

In the registration and settlement process, the settlement process is performed based on the identification result acquired in S20 (S21). In a case where the information for identifying the person is acquired as the identification result, for example, it is possible to acquire the electronic money information or the point information, which corresponds to the information for identifying the person, from the server, and to perform the settlement process using the electronic money information or the point information. On the other hand, in a case where no person concerned is acquired as the identification result, it is possible to perform the settlement process using, for example, another method.

Here, an example in which the camera captures the moving image is described. In a case where the camera captures the still image, the processes of S14 to S16 are performed according to the notification of S11 in the authentication process, and the identification result is notified to the registration and settlement process at any timing. Furthermore, in a case where the operation of starting the settlement process is received (Yes in S13) in the registration and settlement process, the settlement process is performed (S21) based on the identification result which is notified from the authentication process at any timing.

Figure 4:
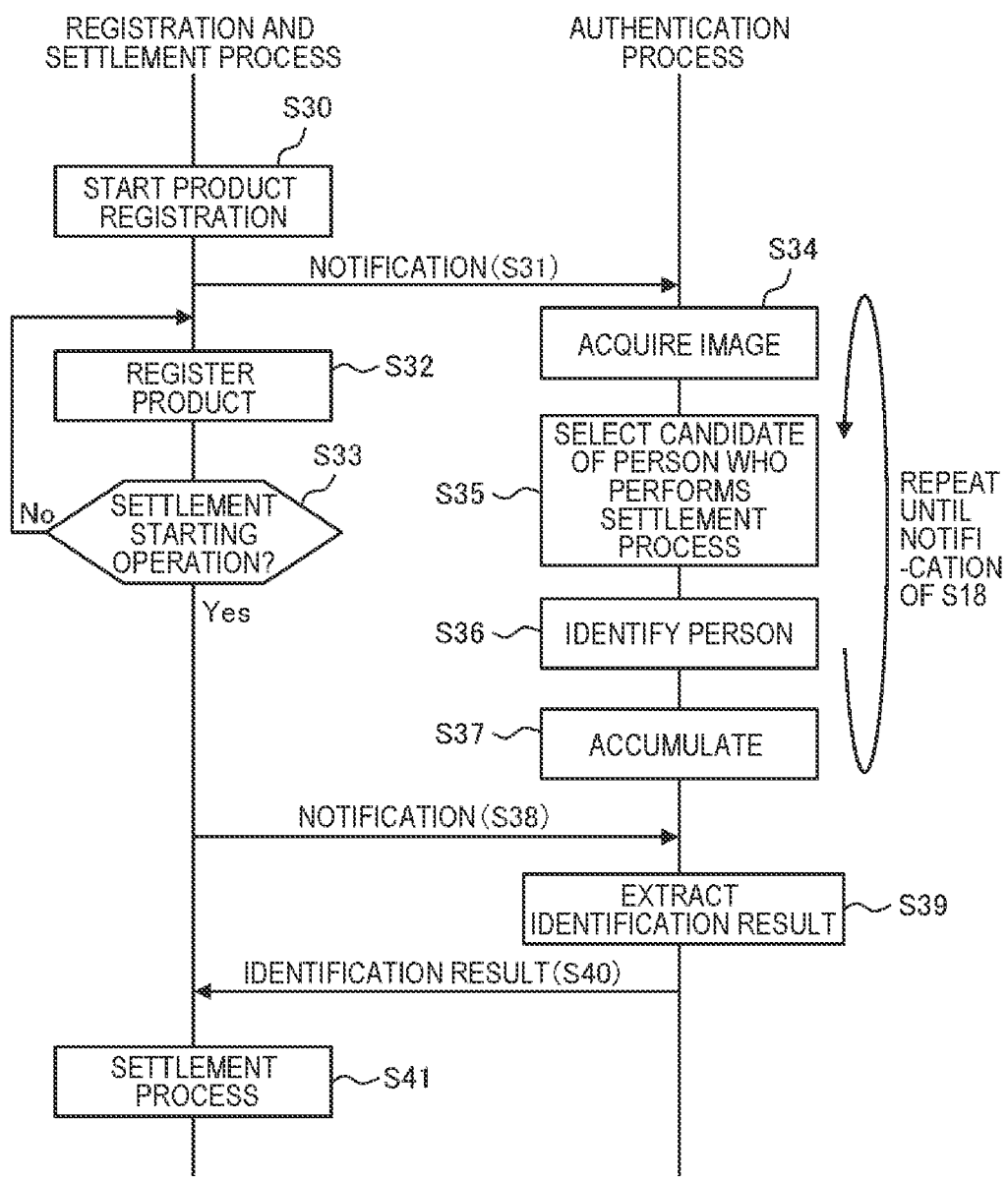
FIG. 4 is a sequence diagram illustrating an example of the flow of the process of the information processing system of the present example embodiment.

Subsequently, another example of the flow of the process of the information processing system 100 of the present example embodiment will be described with reference to a sequence diagram of FIG. 4. Here, it is assumed that the selection unit 14 decides the person of which the distance from the camera is equal to or less than the reference value as the candidates of the person who performs the settlement process, and decides a person who satisfies a prescribed condition as the person who performs the settlement process among candidates.

The information processing system 100 performs the registration and settlement process and the authentication process (the process of identifying the person who performs the settlement process) in parallel. First, in a case where the product registration process starts in the registration and settlement process (S30), a notification thereof is provided to the authentication process (S31). In the authentication process, the process of identifying the customer starts according to the notification thereof. Specifically, the image is acquired (S34), and the candidates who perform the settlement process are selected from among the persons included in the image (S35). In S35, first, the persons included in the image are extracted. Furthermore, the persons of which the distance from the camera is equal to or less than the reference value are selected as the candidates of the person who performs the settlement process from among the persons included in the image.

Thereafter, the information processing system 100 performs a process of identifying each of the candidates of the person who performs the settlement process (S36). That is, the feature value of the appearance of each of the candidates is extracted, and the collation process is performed using the database information. Furthermore, the information processing system 100 accumulates the identification results (information for identifying the person or no person concerned) for each of the candidates (S37). In the authentication process, S34 to S37 are repeated until a notification of S38 is received.

On the other hand, in the registration and settlement process, the product registration is received (S32) even after the product registration process in S30 starts. While the operation of starting the settlement process is not performed (No in S33), the product registration is received (S32). When the operation of starting the settlement process is performed (Yes in S33), a notification thereof is provided to the authentication process (S38).

In the authentication process, for example, the process of identifying the customer (S34 to S37) ends according to the notification of S38. Furthermore, the person who performs the settlement process is decided among the candidates of the person who performs the settlement process (S39), and an identification result of the person is notified to the registration and settlement process (S40).

In S39, the information processing system 100 groups the same person who is selected as the candidate over the plurality of frames based on, for example, results (for example: the identification result (information for identifying the person or no person concerned) of each of the candidates and the feature value of the appearance are associated with each frame on which the image analysis is performed) accumulated by that time. For example, similar feature values of the respective persons extracted from the image may be collectively grouped. Furthermore, in a case where a plurality of groups are generated, the information processing system 100 may decide that there exist a plurality of candidates of the person who performs the settlement process. On the other hand, in a case where one group is generated, the information processing system 100 may decide that there exists one candidate of the person who performs the settlement process.

In a case where there exist the plurality of candidates of the person who performs the settlement process, it is possible to select a person who satisfies another condition as the person who performs the settlement process from among the candidates. Another condition is the same as described above. On the other hand, in a case where there exists one candidate of the person who performs the settlement process, it is possible to select the person as the person who performs the settlement process.

In the registration and settlement process, the settlement process is performed based on the identification result acquired in S40 (S41). In a case where the information for identifying the person is acquired as the identification result, for example, it is possible to acquire the electronic money information or the point information, which corresponds to the information for identifying the person, from the server, and to perform the settlement process using the electronic money information or the point information. On the other hand, in a case where no person concerned is acquired as the identification result, it is possible to perform the settlement process using, for example, another method.

Here, the example in which the camera captures the moving image is described. In the case where the camera captures the still image, S34, S35, S36, and S39 are performed in this order according to a notification of S31 in the authentication process, and the identification result is notified to the registration and settlement process at any timing. Furthermore, in a case where the operation of starting the settlement process is received (Yes in S33) in the registration and settlement process, the settlement process is performed (S41) based on the identification result which is notified from the authentication process at any timing.

According to the above-described information processing system 100 of the present example embodiment, it is possible to select one person who performs the settlement process from among the plurality of persons, for example, even in a case where the plurality of persons are included in the image and the plurality of persons are extracted from the image. As a result, it is possible to appropriately perform the settlement process based on the information (for example: the electronic money information or the point information) corresponding to the selected person.

In addition, it is possible for the information processing system 100 of the present example embodiment to select the person who performs the settlement process based on the distance from the checkout apparatus. For example, it is considered that the person who performs the settlement process is located near to the checkout apparatus in order to perform an operation for the settlement or to deal with the sales clerk. Therefore, it is possible for the information processing system 100 of the present example embodiment to select the person of which the distance from the checkout apparatus is the shortest as the person who performs the settlement process. As a result, it is possible to accurately select the person who performs the settlement process from among the plurality of extracted persons.

In addition, it is possible for the information processing system 100 to select a person of which the distance from the checkout apparatus is equal to or less than the reference value and who satisfies another condition as the person who performs the settlement process. In addition, it is possible for the information processing system 100 to select a person whose appearance frequency is equal to or larger than a prescribed value and who satisfies another condition as the person who performs the settlement process. In addition, it is possible for the information processing system 100 to select a person whose appearance period of time is equal to or larger than a prescribed value and who satisfies another condition as the person who performs the settlement process.

For example, it is considered that the person who performs the settlement process is located in front of the information processing system 100 or the sales clerk for the longest time in order to perform the operation for the settlement or to deal with the sales clerk and is included in the image captured by the camera for the longest time. Therefore, it is possible for the information processing system 100 to select the person of which the distance from the checkout apparatus is equal to or less than the reference value and of which the frequency or the period of time acquired by capturing with the camera in the prescribed time frame (for example: time frame during which checkout is performed) is the greatest as the person who performs the settlement process. As a result, it is possible to accurately select the person who performs the settlement process from among the plurality of extracted persons.

In addition, it is possible to select the person of which the distance from the checkout apparatus is equal to or less than the reference value and who performs prescribed speech and behavior for the settlement as the person who performs the settlement process. For example, it is possible to select a person who makes a remark for the payment method as the person who performs the settlement process. As a result, it is possible to accurately select the person who performs the settlement process from among the plurality of extracted persons.

In addition, for example, it is considered that a parent performs settlement in a case where the parent and a child come to a store. Therefore, for example, in a case where the person of which the estimated age is equal to or larger than the reference value and the person of which the estimated age is less than the reference value are extracted, it is possible for the information processing system 100 of the present example embodiment to select the person who performs the settlement process while excluding the person of which the estimated age is less than the reference value. As a result, it is possible to accurately select the person who performs the settlement process from among the plurality of extracted persons.

In addition, for example, in a case where the person who is included in a poster, a signboard, or the like is included in the image, the information processing system 100 may extract the person from the image. The information processing system 100 of the present example embodiment selects the person who performs the settlement process while excluding a person who does not move, and thus it is possible to select the person who performs the settlement process while excluding the person who is included in the poster, the signboard, or the like. As a result, it is possible to accurately select the person who performs the settlement process from among the plurality of extracted persons.

In addition, in the present example embodiment, it is possible to select the person who performs the settlement process based on a condition, such as "the distance from the checkout apparatus is equal to or less than the reference value", which can be relatively easily decided. Furthermore, in a case where the plurality of persons are selected with such an index, that is, only in a case where the persons are not narrowed down to one person, it is possible to select the person who performs the settlement process based on another condition with a higher degree of difficulty in detection. With the configuration, it is possible to reduce a processing burden of the computer.

Second Example Embodiment

In an information processing system 100 of the present example embodiment, a configuration of the selection unit 14 is different from the first example embodiment. The other configurations are the same as in the first example embodiment.

In a case where persons included in the image are extracted and a plurality of persons are extracted, the selection unit 14 selects the person who performs the settlement process based on mainly at least one of the appearance frequency (that is, the frequency acquired by capturing with the camera during the prescribed time frame) and the appearance period of time (that is, the period of time acquired by capturing with the camera during the prescribed time frame).

For example, the selection unit 14 may select the person of which the frequency acquired by capturing with the camera during the prescribed time frame is the highest or the person of which the period of time acquired by capturing with the camera during the prescribed time frame is the longest as the person who performs the settlement process. In addition, the selection unit 14 may select the person of which the frequency acquired by capturing with the camera during the prescribed time frame or of which the period of time acquired by capturing with the camera during the prescribed time frame is equal to or larger than the reference value as the candidate of the person who performs the settlement process. Furthermore, in a case where there exist the plurality of candidates who are selected based on the frequency acquired by capturing with the camera during the prescribed time frame or the period of time acquired by capturing with the camera during the prescribed time frame, the selection unit 14 may select the person who performs the settlement process from among the plurality of candidates based on another condition.

Here, another condition will be described which is applied to the case where there exist the plurality of candidates who are selected based on the frequency acquired by capturing with the camera during the prescribed time frame or the time acquired by capturing with the camera during the prescribed time frame. For example, the selection unit 14 may select the person of which the distance from the checkout apparatus (in a case of the present example embodiment, the information processing system 100) is the shortest as the person who performs the settlement process from among the plurality of candidates. For example, a person of which a frequency that the distance from the checkout apparatus is the smallest is high or of which a period of time that the distance from the checkout apparatus is the smallest is long during the prescribed time frame may be selected as the person who performs the settlement process. In addition, the person of which the distance from the checkout apparatus is the shortest at a prescribed timing (for example: a timing in which the operation of starting the settlement process is performed) may be selected as the person who performs the settlement process.

Another example of another condition will be described. For example, the selection unit 14 may select the person who performs the prescribed behavior, which is previously decided, as the person who performs the settlement process from among the plurality of candidates. The prescribed behavior is a prescribed behavior which is considered to be performed by the person who performs the settlement process. For example, although "raising hand", "pointing themself using a finger or the like", and the like are exemplified, the present invention is not limited thereto. These are behaviors which are considered to be performed by the person who performs the settlement process in response to an inquiry "who will pay for?" from the sales clerk.

Another example of another condition will be described. For example, the selection unit 14 may select a person who makes a remark, which is previously decided, as the person who performs the settlement process from among the plurality of candidates. Content of the remark is considered to be given by the person who performs the settlement process. For example, information, which is used to specify a settlement method, and the like may be considered to be the content of the remark. That is, "cash", a "card", a name or a popular name of a prescribed payment service, and the like may be considered. For example, in a case where a name of the payment service using the face authentication is "face pass", the selection unit 14 may identify a person who makes a remark of "face pass".

In a case of the example, the information processing system 100 may include a microphone. Furthermore, the selection unit 14 may detect that a prescribed remark as described above is made by performing voice analysis on sounds which are collected by the microphone. Furthermore, the selection unit 14 may analyze a moving image captured by the camera, and may identify a person whose mouth is moving (or a person who performs prescribed movement corresponding to the content of the remark) at a timing in which the prescribed remark is detected.

It should be noted that, the selection unit 14 may select the person who performs the settlement process (a person who satisfies a condition of the distance from the camera or another condition) from among the persons of which estimated ages estimated based on the image are equal to or larger than the reference value. In other words, the selection unit 14 may exclude persons of which the estimated ages estimated based on the image are less than the reference value from the person who performs the settlement process.

It should be noted that, in a case where the persons of which the estimated ages are equal to or larger than the reference value and the persons of which the estimated ages are less than the reference value are extracted from the image, the selection unit 14 may select the person who performs the settlement process from among the persons of which the estimated ages are equal to or larger than the reference value. That is, in a case where only the persons of which the estimated ages are less than the reference value are extracted, the selection unit 14 may select the person who performs the settlement process from among the persons of which the estimated ages are less than the reference value.

In addition, the selection unit 14 may select the person who performs the settlement process (the person who satisfies the condition of the distance from the camera and another condition) from among persons who make movement. In other words, the selection unit 14 may exclude persons who do not make the movement from the person who performs the settlement process.

It should be noted that, in a case where one person is extracted from the image, it is possible for the selection unit 14 to select the person as the person who performs the settlement process.

Here, an example of a flow of a process of the information processing system 100 of the present example embodiment will be described with reference to a sequence diagram of FIG. 5. Here, the selection unit 14 selects the person who performs the settlement process based on the frequency acquired by capturing with the camera during the prescribed time frame or the period of time acquired by capturing with the camera during the prescribed time frame. Note that, the camera captures the moving image.

The information processing system 100 performs a registration and settlement process and an authentication process (a process of identifying the person who performs the settlement process) in parallel. First, in a case where the product registration process starts in the registration and settlement process (S50), a notification thereof is provided to the authentication process (S51).

In the registration and settlement process, the product registration is received even after the product registration process in S50 starts (S52). While the operation of starting the settlement process is not performed (No in S53), the product registration is received (S52). In a case where the operation of starting the settlement process is performed (Yes in S53), a notification thereof is provided to the authentication process (S54).

In the authentication process, the process of identifying the customer starts according to the notification of S54. Specifically, the moving image, which is generated by the camera during the prescribed time frame (for example: between the notification of S51 and the notification of S54), is processed, and the person who performs the settlement process is selected (S55).

For example, the person of which the frequency acquired by capturing with the camera during the prescribed time frame is the highest or the person of which the period of time acquired by capturing with the camera during the prescribed time frame is the longest may be decided as the person who performs the settlement process. In addition, the person of which the frequency acquired by capturing with the camera during the prescribed time frame or of which the period of time acquired by capturing with the camera during the prescribed time frame is equal to or larger than the reference value may be decided as the candidate of the person who performs the settlement process. Furthermore, in a case where there exist the plurality of candidates who are decided based on the frequency acquired by capturing with the camera during the prescribed time frame or the period of time acquired by capturing with the camera during the prescribed time frame, the person who performs the settlement process may be selected from among the plurality of candidates based on another condition. The details are the same as described above.

Thereafter, the feature value of the appearance of the person who is selected as the person who performs the settlement process is extracted from the image, and the person who performs the settlement process is identified based on the feature value and the database information in which the feature value of the appearance of each of the plurality of persons is registered (S56). Furthermore, the identification result (the information for identifying the person or no person concerned) is notified to the registration and settlement process (S57).

In the registration and settlement process, the settlement process is performed based on the identification result acquired in S57 (S58). In a case where the information for identifying the person is acquired as the identification result, for example, it is possible to acquire the electronic money information or the point information, which corresponds to the information for identifying the person, from the server, to perform the settlement process using the electronic money information or the point information. On the other hand, in a case where no person concerned is acquired as the identification result, it is possible to perform the settlement process using for example, another method.

According to the above-described information processing system 100 of the present example embodiment, for example, even in a case where the plurality of persons are included in the image and the plurality of persons are extracted from the image, it is possible to select one person who performs the settlement process from among the plurality of persons. As a result, it is possible to appropriately perform the settlement process based on the information (for example: the electronic money information or the point information) corresponding to the selected person.

In addition, it is possible for the information processing system 100 of the present example embodiment to select the person who performs the settlement process based on at least one of the frequency acquired by capturing with the camera during the prescribed time frame and the period of time acquired by capturing with the camera during the prescribed time frame. For example, it is considered that the person who performs the settlement process is located in front of the information processing system 100 or the sales clerk for the longest time in order to perform the operation for the settlement or to deal with the sales clerk and is included in the image captured by the camera for the longest time. Therefore, it is possible for the information processing system 100 to select the person of which the frequency acquired by capturing with the camera in the prescribed time frame (for example: time frame during which checkout is performed) is the highest or of which the period of time acquired by capturing with the camera is the longest as the person who performs the settlement process. As a result, it is possible to accurately select the person who performs the settlement process from among the plurality of extracted persons.

In addition, it is possible for the information processing system 100 to select the person of which the frequency acquired by capturing with the camera during the prescribed time frame or of which the period of time acquired by capturing with the camera during the prescribed time frame is equal to or larger than the reference value and who satisfies another condition as the person who performs the settlement process.

For example, it is considered that the person who performs the settlement process is located near to the information processing system 100 in order to perform the operation for the settlement or to deal with the sales clerk. Therefore, it is possible for the information processing system 100 of the present example embodiment to decide the person of which the frequency acquired by capturing with the camera during the prescribed time frame or of which the period of time acquired by capturing with the camera during the prescribed time frame is equal to or larger than the reference value and of which the distance from the information processing system 100 is the shortest as the person who performs the settlement process. As a result, it is possible to accurately select the person who performs the settlement process from among the plurality of extracted persons.

In addition, it is possible to select the person of which the frequency acquired by capturing with the camera during the prescribed time frame or of which the period of time acquired by capturing with the camera during the prescribed time frame is equal to or larger than the reference value and who performs prescribed speech and behavior for the settlement as the person who performs the settlement process. For example, it is possible to select a person who makes a remark about a payment method as the person who performs the settlement process. As a result, it is possible to accurately select the person who performs the settlement process from among the plurality of extracted persons.

In addition, for example, it is considered that a parent performs settlement in a case where the parent and a child come to a store. Therefore, for example, in a case where the person of which the estimated age is equal to or larger than the reference value and the person of which the estimated age is less than the reference value are extracted, it is possible for the information processing system 100 of the present example embodiment to select the person who performs the settlement process while excluding the person of which the estimated age is less than the reference value. As a result, it is possible to accurately select the person who performs the settlement process from among the plurality of extracted persons.

In addition, for example, in a case where the person who is included in a poster, a signboard, or the like is included in the image, the information processing system 100 may extract the person from the image. The information processing system 100 of the present example embodiment selects the person who performs the settlement process while excluding a person who does not move, and thus it is possible to select the person who performs the settlement process while excluding the person who is included in the poster, the signboard, or the like. As a result, it is possible to accurately select the person who performs the settlement process from among the plurality of extracted persons.

In addition, in the present example embodiment, it is possible to select the person who performs the settlement process based on a condition, such as "the frequency acquired by capturing with the camera during the prescribed time frame or the period of time acquired by capturing with the camera during the prescribed time frame is equal to or larger than the reference value", which can be relatively easily decided. Furthermore, in a case where the plurality of persons are selected with such an index, that is, only in a case where the persons are not narrowed down to one person, it is possible to select the person who performs the settlement process based on another condition with a higher degree of difficulty in detection. With the configuration, it is possible to reduce a processing burden of the computer.

Third Example Embodiment

Figure 11:
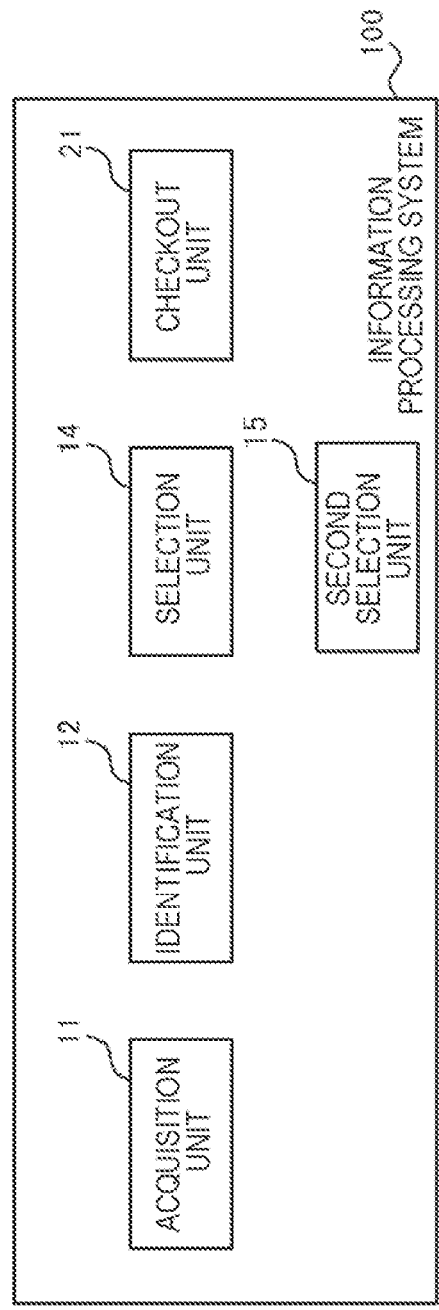
FIG. 11 is an example of a functional block diagram of the information processing system of the present example embodiment.

FIG. 11 illustrates an example of a functional block diagram of an information processing system 100 of the present example embodiment. The information processing system 100 of the present example embodiment is different from those of the first and second example embodiments in that the information processing system 100 includes a second selection unit 15. The other configurations are the same as in the first and second example embodiments.

The second selection unit 15 selects a person who performs a prescribed behavior as a person who performs a settlement process.

For example, the second selection unit 15 may select the person who performs the prescribed behavior, which is previously decided, as the person who performs the settlement process from among persons included in the image acquired by the acquisition unit 11. The prescribed behavior is a prescribed behavior which is considered to be performed by the person who performs the settlement process. For example, although "raising hand", "pointing themself using a finger or the like", and the like are exemplified, the present invention is not limited thereto. These are behaviors which are considered to be performed by the person who performs the settlement process in response to an inquiry "who will pay for?" from the sales clerk.

It should be noted that, in a case where a plurality of persons are selected by the second selection unit 15, a process of selecting the person who performs the settlement process from among the plurality of persons may be performed by the selection unit 14. For example, it is possible for the selection unit 14 to select a person of which a distance from a checkout apparatus is the shortest, a person of which the frequency acquired by capturing with a camera during a prescribed time frame is the highest, or a person of which the period of time acquired by capturing with the camera is long, and the like as the person who performs the settlement process among the plurality of persons selected by the second selection unit 15.

In the present example embodiment, it is also possible to realize the same advantageous effects as in the first and second example embodiments. In addition, according to the present example embodiment, it is possible to perform a process of the selection unit 14 after candidates of the person who performs the settlement process being narrowed down through a process of the second selection unit 15.

Fourth Example Embodiment

Figure 12:
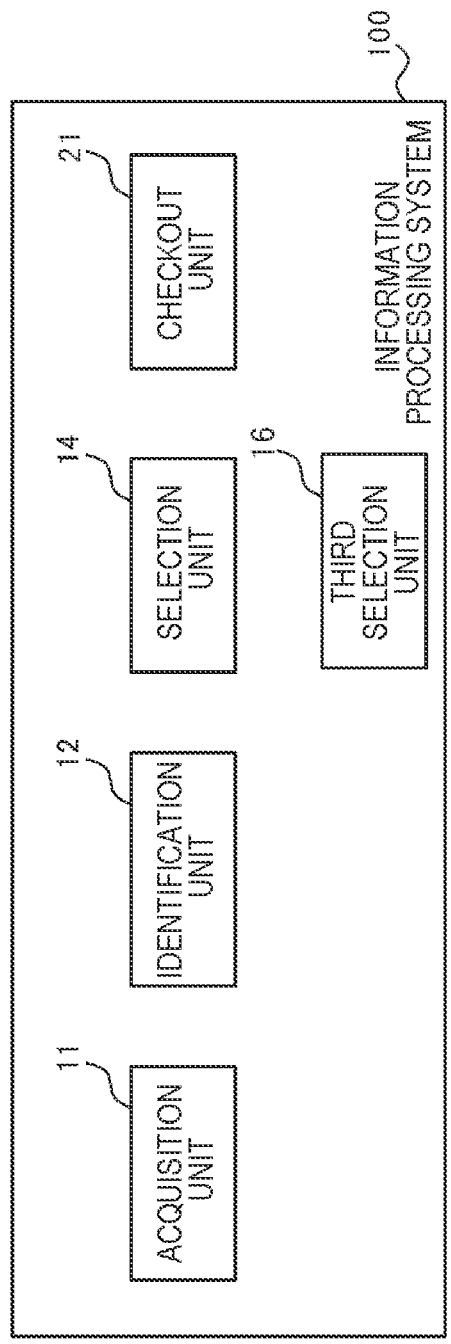
FIG. 12 is an example of a functional block diagram of the information processing system of the present example embodiment.

FIG. 12 illustrates an example of a functional block diagram of an information processing system 100 of the present example embodiment. The information processing system 100 of the present example embodiment is different from those of the first and second example embodiments in that the information processing system 100 includes a third selection unit 16. The other configurations are the same as in the first and second example embodiments.

The third selection unit 16 selects a person who makes a prescribed remark as a person who performs a settlement process.

For example, the third selection unit 16 may select a person who makes a remark, which is previously device, as the person who performs the settlement process among persons included in the image acquired by the acquisition unit 11. Content of the remark is considered to be given by the person who performs the settlement process. For example, information, which is used to identify a settlement method, and the like may be considered to be the content of the remark. That is, "cash", a "card", a name or a popular name of a prescribed payment service, and the like may be considered. For example, in a case where the name of the payment service using a face authentication is "face pass", the second selection unit 15 may identify the person who makes the remark of "face pass".

In a case of the example, the information processing system 100 may include a microphone (voice acquisition unit). Furthermore, in a case where voice analysis is performed on sounds which are collected by the microphone, the third selection unit 16 may detect that the prescribed remark, which is as described above, is made. Furthermore, the third selection unit 16 may analyze a moving image captured by a camera, and may identify a person whose mouth is moving (or a person who is performing prescribed movement corresponding to the content of the remark) at a timing in which the prescribed remark is detected.

It should be noted that, in a case where a plurality of persons are selected by the third selection unit 16, a process of selecting the person who performs the settlement process from among the plurality of persons may be performed by the selection unit 14. For example, it is possible for the selection unit 14 to select a person of which a distance from the checkout apparatus is the shortest, a person of which the frequency acquired by capturing with the camera during a prescribed time frame is the highest, or a person of which the period of time acquired by capturing with the camera is long, and the like as the person who performs the settlement process among the plurality of persons selected by the third selection unit 16.

In the present example embodiment, it is also possible to realize the same advantageous effects as in the first and second example embodiments. In addition, according to the present example embodiment, it is possible to perform a process of the selection unit 14 after candidates of the person who performs the settlement process being narrowed down through a process of the third selection unit 16.

Fifth Example Embodiment

Figure 13:
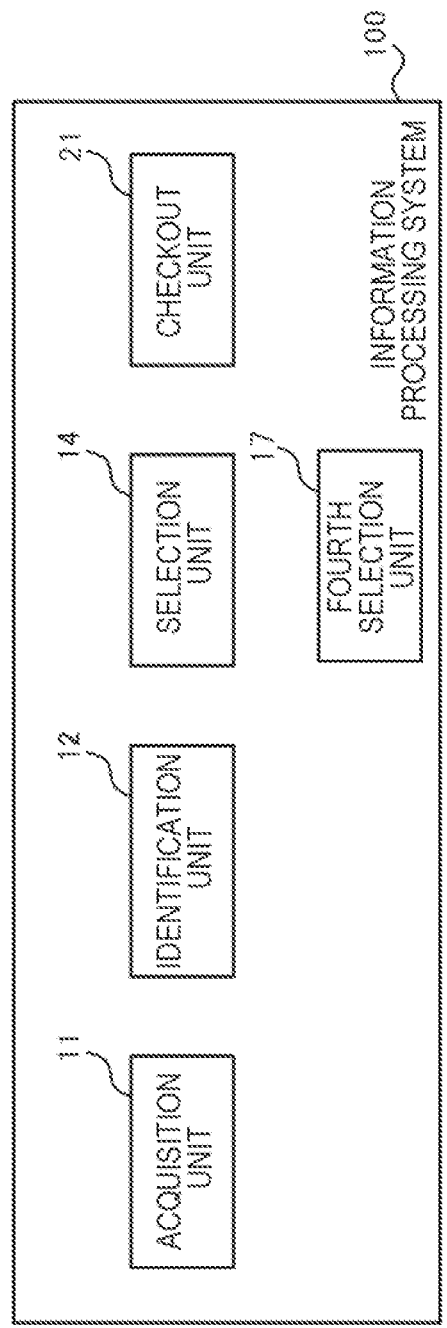
FIG. 13 is an example of a functional block diagram of the information processing system of the present example embodiment.

FIG. 13 is an example of a functional block diagram of an information processing system 100 of the present example embodiment. The information processing system 100 of the present example embodiment is different from those of the first and second example embodiments in that the information processing system 100 includes a fourth selection unit 17. The other configurations are the same as in the first and second example embodiments.

The fourth selection unit 17 selects a person of which an estimated age estimated based on an image acquired by an acquisition unit 11 is equal to or larger than a reference value as a person who performs the settlement process.

In a case where the person of which the estimated age is equal to or larger than the reference value and the persons of which the estimated ages are less than the reference value are extracted from the image, the fourth selection unit 17 may select the person of which the estimated age is equal to or larger than the reference value as the person who performs the settlement process. Furthermore, in a case where only the person of which the estimated age is less than the reference value is extracted, the fourth selection unit 17 may select the person of which the estimated age is less than the reference value as the person who performs the settlement process.

It should be noted that, in a case where a plurality of persons are selected by the fourth selection unit 17, a process of selecting the person who performs the settlement process from among the plurality of persons may be performed by the selection unit 14. For example, it is possible for the selection unit 14 to select a person of which a distance from a checkout apparatus is the shortest, a person of which the frequency acquired by capturing with a camera during a prescribed time frame is the highest, or a person of which the period of time acquired by capturing with the camera is long, and the like as the person who performs the settlement process among the plurality of persons selected by the fourth selection unit 17.

In the present example embodiment, it is also possible to realize the same advantageous effects as in the first and second example embodiments. In addition, according to the present example embodiment, it is possible to perform a process of the selection unit 14 after candidates of the person who performs the settlement process being narrowed down through a process of the fourth selection unit 17.

Sixth Example Embodiment

Figure 14:
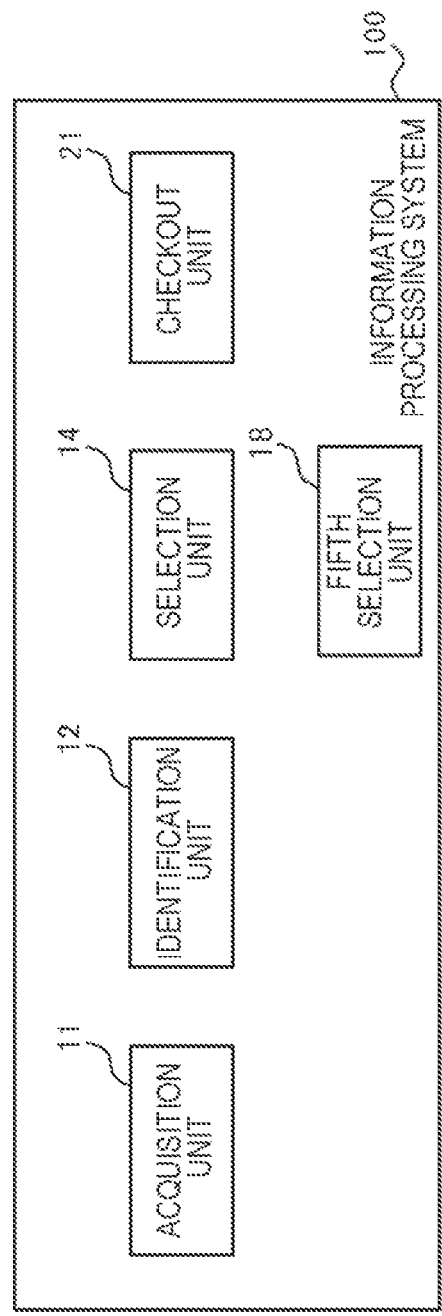
FIG. 14 is an example of a functional block diagram of the information processing system of the present example embodiment.

FIG. 14 is an example of a functional block diagram of an information processing system 100 of the present example embodiment. The information processing system 100 of the present example embodiment is different from those of the first and second example embodiments in that the information processing system 100 includes a fifth selection unit 18. The other configurations are the same as in the first and second example embodiments.

The fifth selection unit 18 selects a person who makes movement as a person who performs the settlement process.

It should be noted that, in a case where a plurality of persons are selected by the fifth selection unit 18, a process of selecting the person who performs the settlement process from among the plurality of persons may be performed by the selection unit 14. For example, it is possible for the selection unit 14 to select a person of which a distance from a checkout apparatus is the shortest, a person of which the frequency acquired by capturing with a camera during the prescribed time frame is the highest, or a person of which the period of time acquired by capturing with the camera is long, and the like as the person who performs the settlement process among the plurality of persons selected by the fifth selection unit 18.

In the present example embodiment, it is also possible to realize the same advantageous effects as in the first and second example embodiments. In addition, according to the present example embodiment, it is possible to perform a process of the selection unit 14 after candidates of the person who performs the settlement process being narrowed down through a process of the fifth selection unit 18.

Seventh Example Embodiment

Figure 6:
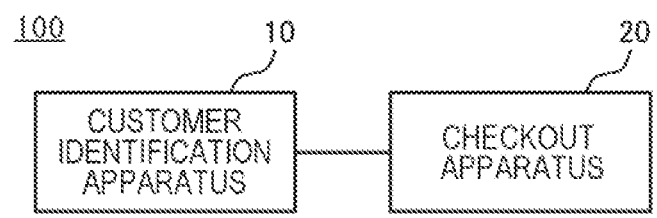
FIG. 6 is an example of a functional block diagram of the information processing system of the present example embodiment.

As illustrated in FIG. 6, an information processing system 100 of the present example embodiment includes a customer identification apparatus 10 and a checkout apparatus 20. An information processing system 100 realizes the prescribed process described in the first to sixth example embodiments through a process cooperatively performed by the customer identification apparatus 10 and the checkout apparatus 20. Although a realization example will be described later, the customer identification apparatus 10 and the checkout apparatus 20 may be configured to be physically and/or logically integrated, or may be configured to be physically and/or logically separated.

First, an example of a hardware configuration of the customer identification apparatus 10 and the checkout apparatus 20 will be described. The respective functional units, which are included in the customer identification apparatus 10 and the checkout apparatus 20 of the present example embodiment, are realized by any combination of hardware and software of any computer based on a CPU, a memory, a program which is loaded on the memory, a storage unit (which is capable of storing a program which is downloaded from a storage medium, such as CD, a server on the Internet, or the like, in addition to a program that is previously stored from a stage in which an apparatus is delivered), such as a hard disk, which stores the program, and an interface for network connection. Furthermore, those skilled in the art understand that various modification examples exist for a realization method and an apparatus thereof.

FIG. 2 is a block diagram illustrating the hardware configuration of the customer identification apparatus 10 and the checkout apparatus 20 of the present example embodiment. As illustrated in FIG. 2, the customer identification apparatus 10 and the checkout apparatus 20 include the processor 1A, the memory 2A, the input and output interface 3A, the peripheral circuit 4A, and the bus 5A. The peripheral circuit 4A includes various modules. Note that, in a case where the customer identification apparatus 10 and the checkout apparatus 20 are configured to be physically and/or logically separated, each of the customer identification apparatus 10 and the checkout apparatus 20 includes the hardware configuration as illustrated in FIG. 2.

The bus 5A is a data transmission path which is used for the processor 1A, the memory 2A, the peripheral circuit 4A, and the input and output interface 3A to transmit and receive data to and from each other. The processor 1A is, for example, an arithmetic processing unit such as the Central Processing Unit (CPU) or a Graphics Processing Unit (GPU). The memory 2A is, for example, a memory such as a Random Access Memory (RAM) or a Read Only Memory (ROM). The input and output interface 3A includes an interface which is used to acquire information from an input apparatus (for example: a keyboard, a mouse, a microphone, a physical key, a touch panel display, a code reader, or the like), an external apparatus, an external server, an external sensor, and the like, and an interface which is used to output information to an output apparatus (for example: a display, a speaker, a printer, an emailer, or the like), the external apparatus, the external server, and the like. It is possible for the processor 1A to output an instruction to each of the modules and to perform an arithmetic operation based on an arithmetic result of each of the modules.

Figure 7:
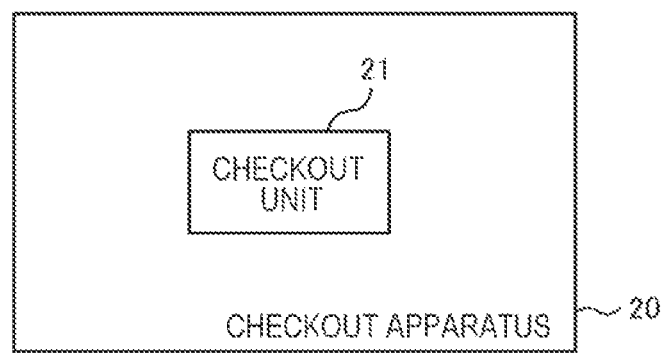
FIG. 7 is an example of a functional block diagram of a checkout apparatus of the present example embodiment.

FIG. 7 illustrates an example of a functional block diagram of the checkout apparatus 20. As illustrated in the drawing, the checkout apparatus 20 includes a checkout unit 21. Since a configuration of the checkout unit 21 is the same as in the first to sixth example embodiments, the description thereof will not be repeated.

Figure 8:
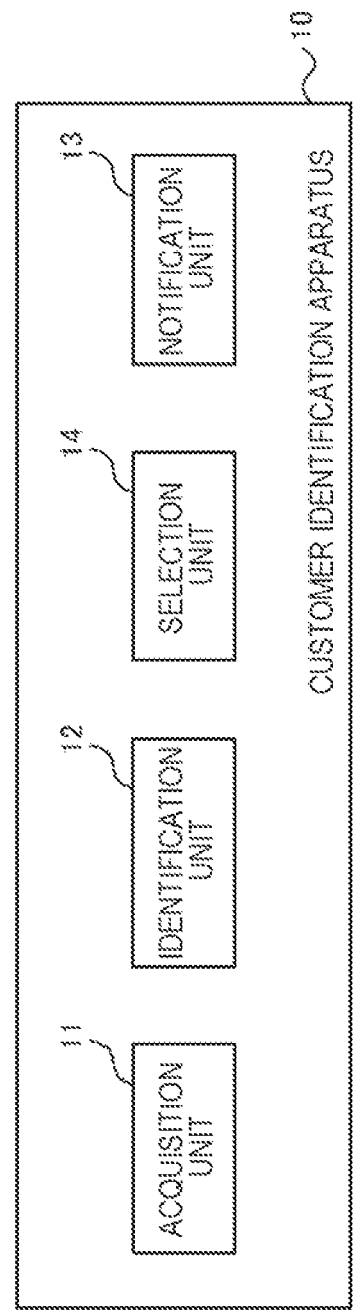
FIG. 8 is an example of a functional block diagram of a customer identification apparatus of the present example embodiment.

FIG. 8 illustrates an example of a functional block diagram of the customer identification apparatus 10. As illustrated in the drawing, the customer identification apparatus 10 includes an acquisition unit 11, an identification unit 12, a notification unit 13, and a selection unit 14. The customer identification apparatus 10 may further include a second selection unit 15, a third selection unit 16, a fourth selection unit 17, or a fifth selection unit 18. Since configurations of the acquisition unit 11, the identification unit 12, the selection unit 14, the second selection unit 15, the third selection unit 16, the fourth selection unit 17, and the fifth selection unit 18 are the same as in the first to sixth example embodiments, the description thereof will not be repeated.

The notification unit 13 notifies an identification result of the identification unit 12 with respect to a person who is decided as a person who performs a settlement process by the selection unit 14 to the checkout apparatus 20. The identification result is information for identifying the person who performs the settlement process or no person concerned.

It should be noted that, it is possible for the customer identification apparatus 10 and the checkout apparatus 20 to transmit and receive information to and from each other. For example, the checkout apparatus 20 acquires the identification result from the customer identification apparatus 10.

In addition, the checkout apparatus 20 notifies that a prescribed operation is performed to the customer identification apparatus 10. As an example, when the prescribed operation, which is performed before the operation of starting the settlement process is performed, is performed during a checkout process (a registration process, the settlement process, or the like) with respect to a certain customer, the checkout apparatus 20 may notify that the operation is performed to the customer identification apparatus 10 in response to the operation. For example, the checkout apparatus 20 may notify that an initial product registration is performed during the checkout process with respect to the customer to the customer identification apparatus 10. As another example, the checkout apparatus 20 may notify that the operation of starting the settlement process is performed to the customer identification apparatus 10.

Figure 3:
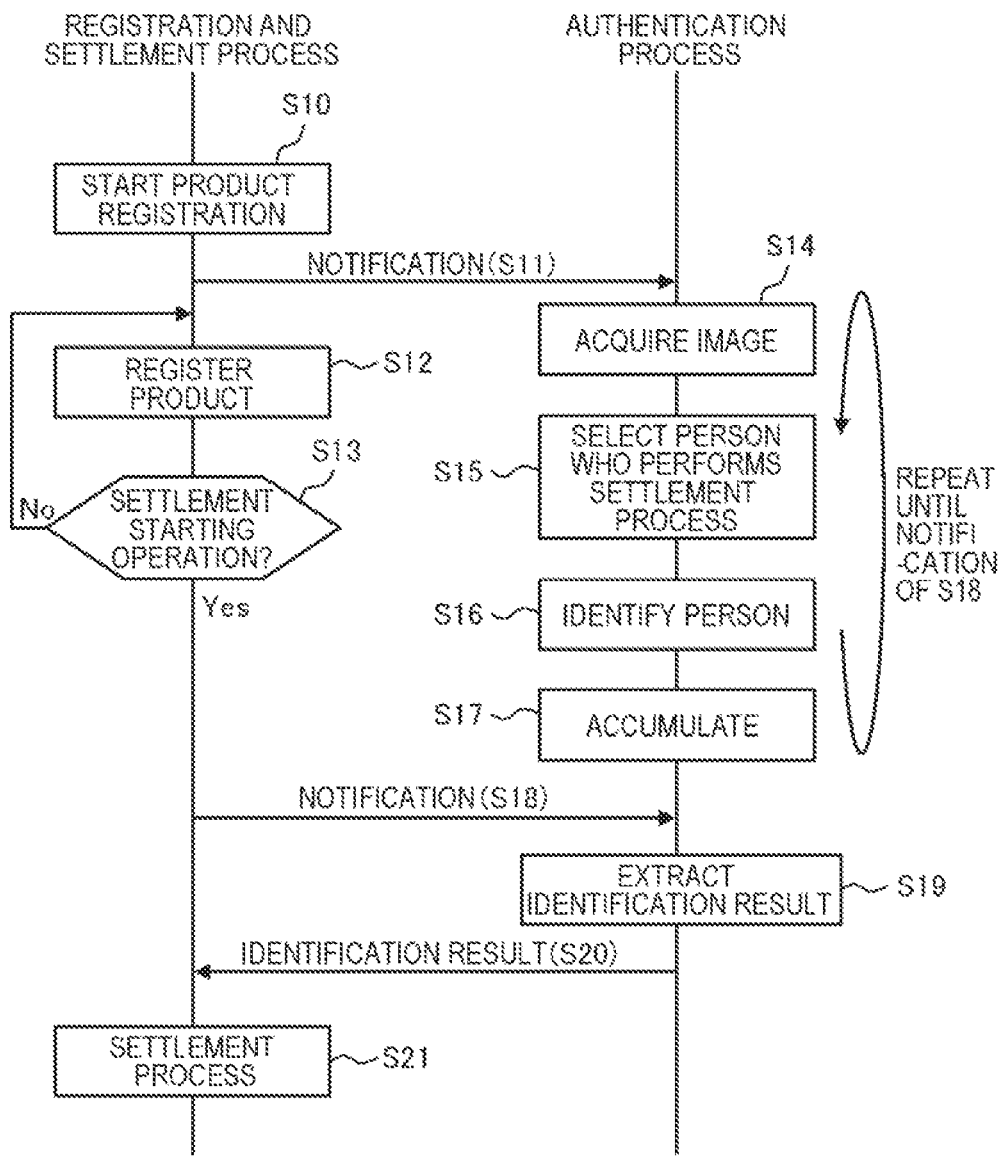
FIG. 3 is a sequence diagram illustrating an example of a flow of a process of the information processing system of the present example embodiment.
Figure 5:
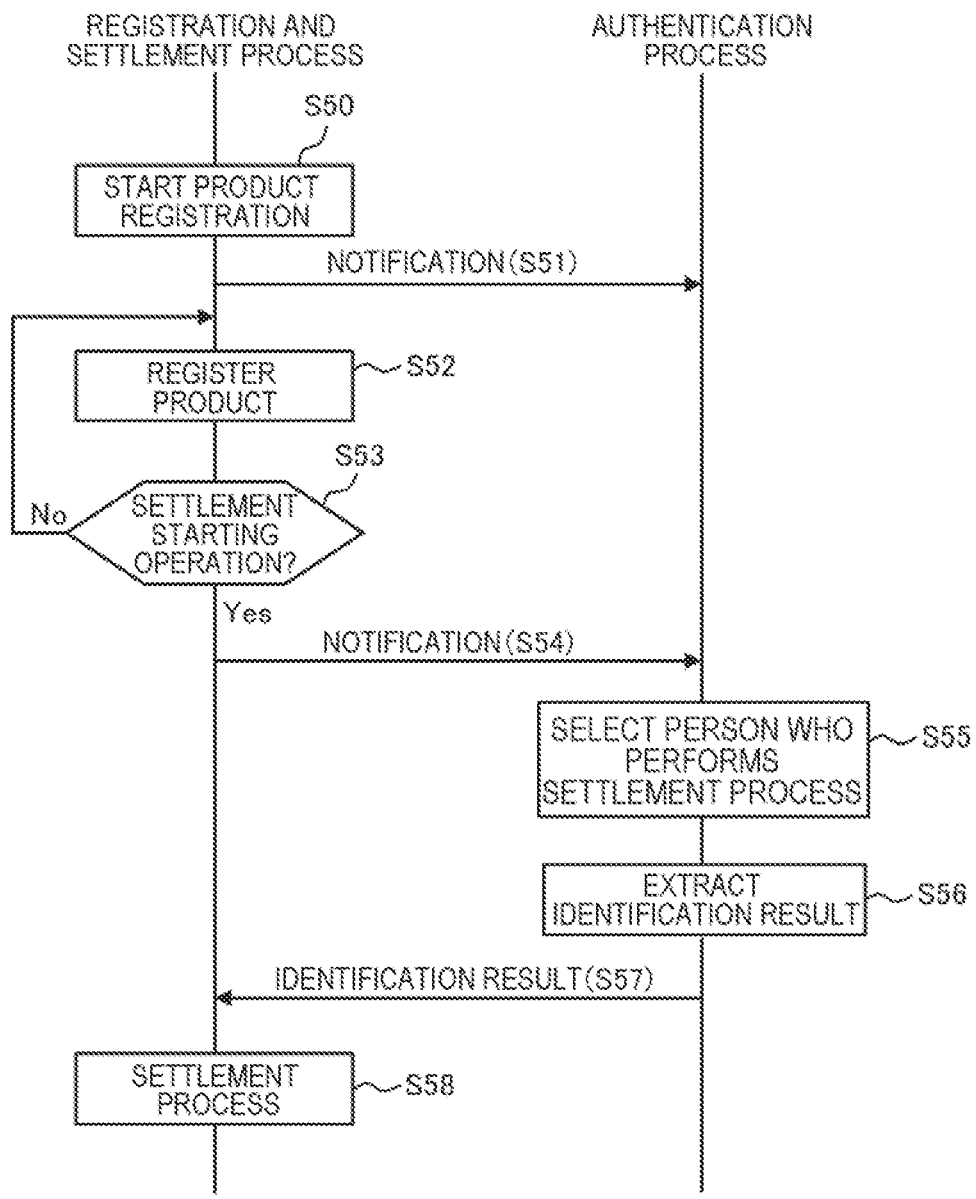
FIG. 5 is a sequence diagram illustrating an example of the flow of the process of the information processing system of the present example embodiment.

A flow of a process of the information processing system 100 of the present example embodiment is the same as those illustrated in the sequence diagrams of FIGS. 3 and 5. The registration and settlement process illustrated in the drawing is performed by the checkout apparatus 20, and the authentication process illustrated in the drawing is performed by the customer identification apparatus 10.

Subsequently, a realization example of the information processing system 100 of the present example embodiment, which is realized by the customer identification apparatus 10 and the checkout apparatus 20, will be described.

Figure 9:
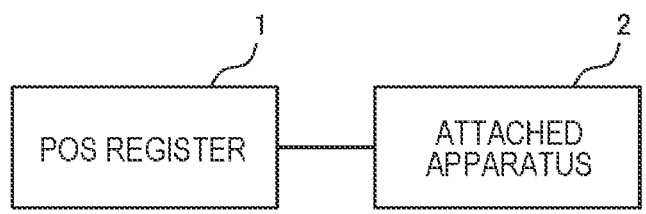
FIG. 9 is a diagram illustrating a realization example of the information processing system of the present example embodiment.

As illustrated in FIG. 9, the customer identification apparatus 10 and the checkout apparatus 20 may be realized by a POS register 1 and an attachment apparatus 2 which are physically and/or logically separated. The POS register 1 and the attachment apparatus 2 are configured to be able to communicate with each other in wired and/or wireless manner. The POS register 1 and the attachment apparatus 2 may be connected one to one as illustrated in the drawing, or a plurality of POS registers 1 may be connected to one attachment apparatus 2.

In a case of an example of FIG. 9, the checkout apparatus 20 may be realized by the POS register 1 and the customer identification apparatus 10 may be realized by the attachment apparatus 2.

In addition, the checkout apparatus 20 and a partial function of the customer identification apparatus 10 may be realized by the POS register 1, and another partial function of the customer identification apparatus 10 may be realized by the attachment apparatus 2. For example, the acquisition unit 11 of the customer identification apparatus 10 and the partial function (for example: a function of extracting a person from an image and a function of extracting a feature value of the person) of the identification unit 12 may be realized by the POS register 1. Furthermore, another partial function (for example: a function of collating the feature value of the person extracted from the image with database information in which a feature value of appearance of each of the plurality of persons is registered) of the identification unit 12, the notification unit 13, and the selection unit 14 may be realized by the attachment apparatus 2. The attachment apparatus 2 may further include the second selection unit 15, the third selection unit 16, the fourth selection unit 17, or the fifth selection unit 18.

According to the above-described information processing system 100 of the present example embodiment, advantageous effects which are the same as in the first and second example embodiments are acquired. In addition, as illustrated in FIG. 9, with a configuration in which the information processing system 100 is realized by the POS register 1 and another apparatus (attachment apparatus 2), it is possible to use an existing POS register 1 which does not include a function of executing the face authentication process. As a result, it is possible to save costs for introducing a new system.

Eighth Example Embodiment

In the present example embodiment, an information processing system 100 is realized by a customer identification apparatus 10 and a checkout apparatus 20 as the same as in the seventh example embodiment. A realization example of the information processing system 100 of the present example embodiment is different from that of the seventh example embodiment. The other configurations are the same as in the seventh example embodiment.

Figure 10:
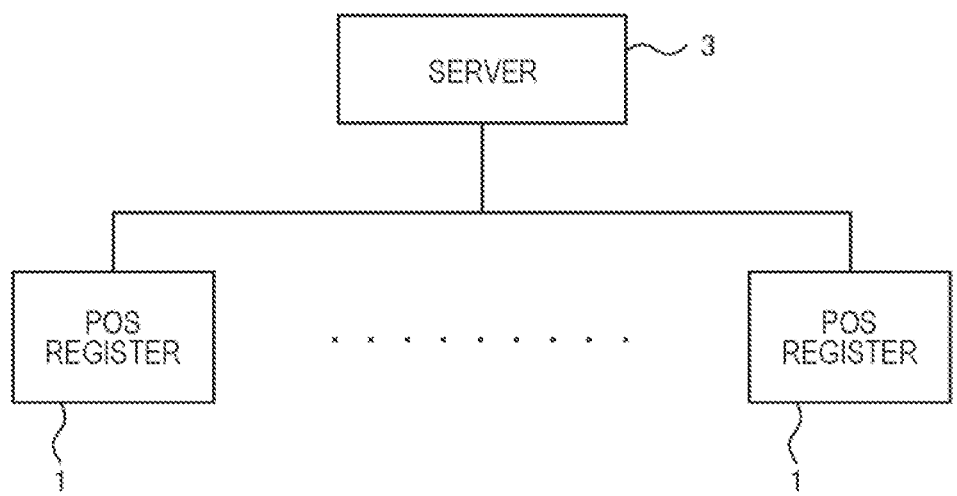
FIG. 10 is a diagram illustrating a realization example of the information processing system of the present example embodiment.

In the present example embodiment, as illustrated in FIG. 10, the customer identification apparatus 10 and the checkout apparatus 20 are realized by a POS register 1 and a server 3 which are physically and/or logically separated. The POS register 1 and the server 3 are configured to be able to communicate with each other in wired and/or wireless manner. As illustrated in the drawing, a plurality of POS registers 1 are connected to one server 3.

In a case of an example of FIG. 10, the checkout apparatus 20 may be realized by the POS register 1 and the customer identification apparatus 10 may be realized by the server 3.

In addition, the checkout apparatus 20 and a partial function of the customer identification apparatus 10 may be realized by the POS register 1, and another partial function of the customer identification apparatus 10 may be realized by the server 3. For example, an acquisition unit 11 of the customer identification apparatus 10 and a partial function (for example: a function of extracting a person from an image and a function of extracting a feature value of the person) of an identification unit 12 may be realized by the POS register 1. Furthermore, another partial function (for example: a function of collating the feature value of the person extracted from the image with database information in which a feature value of appearance of each of the plurality of persons is registered) of the identification unit 12, a notification unit 13, and a selection unit 14 may be realized by the server 3. The server 3 may further include a second selection unit 15, a third selection unit 16, a fourth selection unit 17, or a fifth selection unit 18.

According to the above-described information processing system 100 of the present example embodiment, advantageous effects which are the same as in the first to seventh example embodiments are acquired. In addition, as illustrated in FIG. 10, with a configuration in which the information processing system 100 is realized by the POS register 1 and another apparatus (server 3), it is possible to use an existing POS register 1 which does not include a function of performing a face authentication process. As a result, it is possible to save costs for introducing a new system.

Although a part or whole of the above example embodiments can be described as appendixes below, the present invention is not limited to below.

1. An information processing system including:
an acquisition unit that acquires an image, which is generated by a camera, of a face;
a selection unit that extracts a person in the acquired image, and selects a person who performs a settlement process based on at least one of a distance from a checkout apparatus, an appearance frequency, and an appearance period of time in a case where a plurality of persons are extracted;
an identification unit that identifies the selected person based on the image in which the person is included, and database information in which a feature value of a face is registered; and
a settlement unit that performs the settlement process with respect to the identified person.

2. The information processing system of 1,
in which the selection unit decides a person of which a distance from the checkout apparatus is short as the person who performs the settlement process.

3. The information processing system of 1,
in which the selection unit selects at least any one of a person of which a frequency acquired by capturing with the camera during a prescribed time frame is high and a person of which a period of time acquired by capturing with the camera during a prescribed time frame is long as the person who performs the settlement process.

4. The information processing system of any one of 1 to 3, further including:
a second selection unit that selects a person who performs a prescribed behavior as the person who performs the settlement process.

5. The information processing system of any one of 1 to 4, further including:
a voice acquisition unit that acquires a voice; and
a third selection unit that selects a person who makes a prescribed remark as the person who performs the settlement process based on the acquired voice.

6. The information processing system of any one of 1 to 5, further including:
a fourth selection unit that selects a person of which estimated age estimated based on the image is equal to or larger than a reference value as the person who performs the settlement process.

7. The information processing system of any one of 1 to 6, further including:
a fifth selection unit that selects a person who makes movement as the person who performs the settlement process.

8. A customer identification apparatus including:
an acquisition unit that acquires an image, which is generated by a camera, of a face;
a selection unit that extracts a person in the acquired image, and selects a person who performs a settlement process based on at least one of a distance from a checkout apparatus, an appearance frequency, and an appearance period of time in a case where a plurality of persons are extracted;
an identification unit that identifies the selected person based on the image in which the person is included, and database information in which a feature value of a face is registered; and
a notification unit that notifies information for identifying the person with respect to the person who performs the settlement process and who is identified by the identification unit to the checkout apparatus.

9. An information processing method, which is performed by a computer, the method including:
an acquisition step of acquiring an image, which is generated by a camera, of a face;
a selection step of extracting a person in the acquired image, and selecting a person who performs a settlement process based on at least one of a distance from a checkout apparatus, an appearance frequency, and an appearance period of time in a case where a plurality of persons are extracted;
an identification step of identifying the selected person based on the image in which the person is included, and database information in which a feature value of a face is registered; and
a settlement step of performing the settlement process with respect to the identified person.

10. A program causing a computer to function as:
an acquisition unit that acquires an image, which is generated by a camera, of a face;

a selection unit that extracts a person in the acquired image, and selects a person who performs a settlement process based on at least one of a distance from a checkout apparatus, an appearance frequency, and an appearance period of time in a case where a plurality of persons are extracted;

an identification unit that identifies the selected person based on the image in which the person is included, and database information in which a feature value of a face is registered; and a settlement unit that performs the settlement process with respect to the identified person.

11. A customer identification method, which is performed by a computer, the method including:

an acquisition step of acquiring an image, which is generated by a camera, of a face;

a selection step of extracting a person in the acquired image, and selecting a person who performs a settlement process based on at least one of a distance from a checkout apparatus, an appearance frequency, and an appearance period of time in a case where a plurality of persons are extracted;

an identification step of identifying the selected person based on the image in which the person is included, and database information in which a feature value of a face is registered; and a notification step of notifying information for identifying the person with respect to the person who performs the settlement process and who is identified by the identification unit to the checkout apparatus.

12. A program causing a computer to function as:

an acquisition unit that acquires an image, which is generated by a camera, of a face;

a selection unit that extracts a person in the acquired image, and selects a person who performs a settlement process based on at least one of a distance from a checkout apparatus, an appearance frequency, and an appearance period of time in a case where a plurality of persons are extracted;

an identification unit that identifies the selected person based on the image in which the person is included, and database information in which a feature value of a face is registered; and a notification unit that notifies information for identifying the person with respect to the person who performs the settlement process and who is identified by the identification unit to the checkout apparatus.

Hereinabove, although the present invention is described with reference to the example embodiments, the present invention is not limited to the above example embodiments. In the configurations and details of the present invention, various modifications which can be understood by those skilled in the art in a scope of the present invention.

This application claims priority based on Japanese Patent Application No. 2016-248811 filed on Dec. 22, 2016, and the content of the application is incorporated herein by reference in its entirety.

The invention claimed is:

1. An information processing system comprising:
at least one memory configured to store instructions; and
at least one processor configured to execute the instructions to:
acquire an image generated by a camera;
extract a person in the acquired image;
select a person who performs a settlement process based on a distance from a checkout apparatus in a case where a plurality of persons are extracted;
identify the selected person based on the image in which the person is included, and database information in which a feature value of a face is registered; and
perform the settlement process with respect to the identified person.

2. The information processing system according to claim 1,
wherein the processor is further configured to execute the instructions to select a person of which the distance from the checkout apparatus is equal to or less than a reference value.

3. The information processing system according to claim 1,
wherein the processor is further configured to execute the instructions to select a person of which the distance from the checkout apparatus is the smallest.

4. The information processing system according to claim 1,
wherein the processor is further configured to execute the instructions to decide at least one of a person of which a frequency acquired by capturing during a prescribed time frame is high and a person of which a period of time acquired by capturing during a prescribed time frame is long as the person who performs the settlement process in a case where a plurality of persons are selected.

5. The information processing system according to claim 1,
wherein the processor is further configured to execute the instructions to decide a person who performs a prescribed behavior as the person who performs the settlement process in a case where a plurality of persons are selected.

6. The information processing system according to claim 1,
wherein the processor is further configured to execute the instructions to:
acquire a voice; and
decide a person who makes a prescribed remark as the person who performs the settlement process based on the acquired voice in a case where a plurality of persons are selected.

7. The information processing system according to claim 1,
wherein the processor is further configured to execute the instructions to decide a person of which an estimated age estimated based on the image is equal to or larger than a reference value as the person who performs the settlement process in a case where a plurality of persons are selected.

8. The information processing system according to claim 1,
wherein the processor is further configured to execute the instructions to decide a person who makes movement as the person who performs the settlement process in a case where a plurality of persons are selected.

9. The information processing system according to claim 1,
wherein the processor is further configured to execute the instructions to decide a person of which an estimated age estimated based on the image is equal to or smaller than a reference value as the person who performs the settlement process in a case where a plurality of persons are selected.

10. The information processing system according to claim 1,
wherein the processor is further configured to execute the instructions to decide a person who makes no movement as the person who performs the settlement process in a case where a plurality of persons are selected.

11. An information processing method, which is performed by a computer, the method comprising:
acquiring an image generated by a camera;
extracting a person in the acquired image;
selecting a person who performs a settlement process based on a distance from a checkout apparatus in a case where a plurality of persons are extracted;
identifying the selected person based on the image in which the person is included, and database information in which a feature value of a face is registered; and
performing the settlement process with respect to the identified person.

12. A non-transitory storage medium storing a program causing a computer to:
acquire an image generated by a camera;
extracts a person in the acquired image;
select a person who performs a settlement process based on a distance from a checkout apparatus in a case where a plurality of persons are extracted;
identify the selected person based on the image in which the person is included, and database information in which a feature value of a face is registered; and
perform the settlement process with respect to the identified person.

* * * * *